US009785009B2

(12) United States Patent
Momose et al.

(10) Patent No.: US 9,785,009 B2
(45) Date of Patent: Oct. 10, 2017

(54) LIQUID CRYSTAL DISPLAY DEVICE AND ELECTRONIC APPARATUS

(75) Inventors: Yoichi Momose, Matsumoto (JP); Nobutaka Urano, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 696 days.

(21) Appl. No.: 13/548,566

(22) Filed: Jul. 13, 2012

(65) Prior Publication Data
US 2013/0021558 A1   Jan. 24, 2013

(30) Foreign Application Priority Data

Jul. 19, 2011   (JP) .................................. 2011-157592

(51) Int. Cl.
*G02F 1/1335* (2006.01)
*G02F 1/1333* (2006.01)
*F21V 8/00* (2006.01)

(52) U.S. Cl.
CPC ..... *G02F 1/133615* (2013.01); *G02B 6/0031* (2013.01); *G02B 6/0051* (2013.01); *G02B 6/0068* (2013.01); *G02F 1/133308* (2013.01); *G02F 1/133512* (2013.01); *G02B 6/009* (2013.01); *G02B 6/0055* (2013.01); *G02B 6/0085* (2013.01); *G02F 2001/13332* (2013.01)

(58) Field of Classification Search
CPC ......... G02F 1/133512; G02F 1/133615; G02B 6/009; G02B 6/0085; G02B 6/0031; G02B 6/0051; G02B 6/0058
USPC ..... 349/64, 65, 113; 362/607, 608, 609, 612
See application file for complete search history.

(56) References Cited

U.S. PATENT DOCUMENTS

| | | | |
|---|---|---|---|
| 5,886,759 A | 3/1999 | Mashino et al. | |
| 6,074,070 A | 6/2000 | Sasako | |
| 7,157,125 B2 | 1/2007 | Kamiya et al. | |
| 7,705,931 B2 | 4/2010 | Okuwaki et al. | |
| 8,672,528 B2 * | 3/2014 | Ajichi et al. | 362/609 |
| 9,348,079 B2 | 5/2016 | Lee et al. | |
| 2004/0113162 A1 * | 6/2004 | Mai | 257/88 |

(Continued)

FOREIGN PATENT DOCUMENTS

| | | |
|---|---|---|
| JP | 3023364 U | 4/1996 |
| JP | H08-122778 A | 5/1996 |

(Continued)

OTHER PUBLICATIONS

Jun. 2, 2016 Office Action Issued in U.S. Appl. No. 15/078,539.

(Continued)

*Primary Examiner* — Dung Nguyen
(74) *Attorney, Agent, or Firm* — Oliff PLC

(57) ABSTRACT

In a liquid crystal display device, a reflecting surface is attached to a portion, which overlaps with a periphery portion of a light guiding plate where the light incident section is position in a surface on the light guiding plate side in the dispersing sheet which is positioned farthest to the light guiding plate side among a plurality of optical sheets which are positioned between the light guiding plate and a liquid crystal panel. As a result, light which is emitted from the periphery portion of the light guiding plate is returned into the light guiding plate by being reflected by the reflecting surface, and after this, is emitted as illumination light from a light emitting surface while progressing within the light guiding plate.

34 Claims, 9 Drawing Sheets

(56) References Cited

U.S. PATENT DOCUMENTS

2004/0213018 A1   10/2004  Torihara
2009/0208676 A1*  8/2009  Tanaka et al. ............... 428/32.5
2012/0229730 A1*  9/2012  Kim et al. ..................... 349/64

FOREIGN PATENT DOCUMENTS

| JP | H10-48629 A   |   | 2/1998 |
| JP | H10-161119 A  |   | 6/1998 |
| JP | A-11-149254   |   | 6/1999 |
| JP | 2001-125102 A |   | 5/2001 |
| JP | A-2003-270634 |   | 9/2003 |
| JP | A-2009-38006  |   | 2/2009 |
| JP | A-2010-204433 |   | 9/2010 |
| WO | WO 2011/080955 | * | 7/2011 |

OTHER PUBLICATIONS

Sep. 30, 2016 Office Action Issued in U.S. Appl. No. 15/078,539.
April 11, 2017 Office Action issued in U.S. Appl. No. 15/078,539.
Jul. 14, 2017 Office Action issued in U.S. Appl. No. 15/078,539.
Aug. 11, 2017 Office Action Issued in U.S. Appl. No. 15/606,775.

* cited by examiner

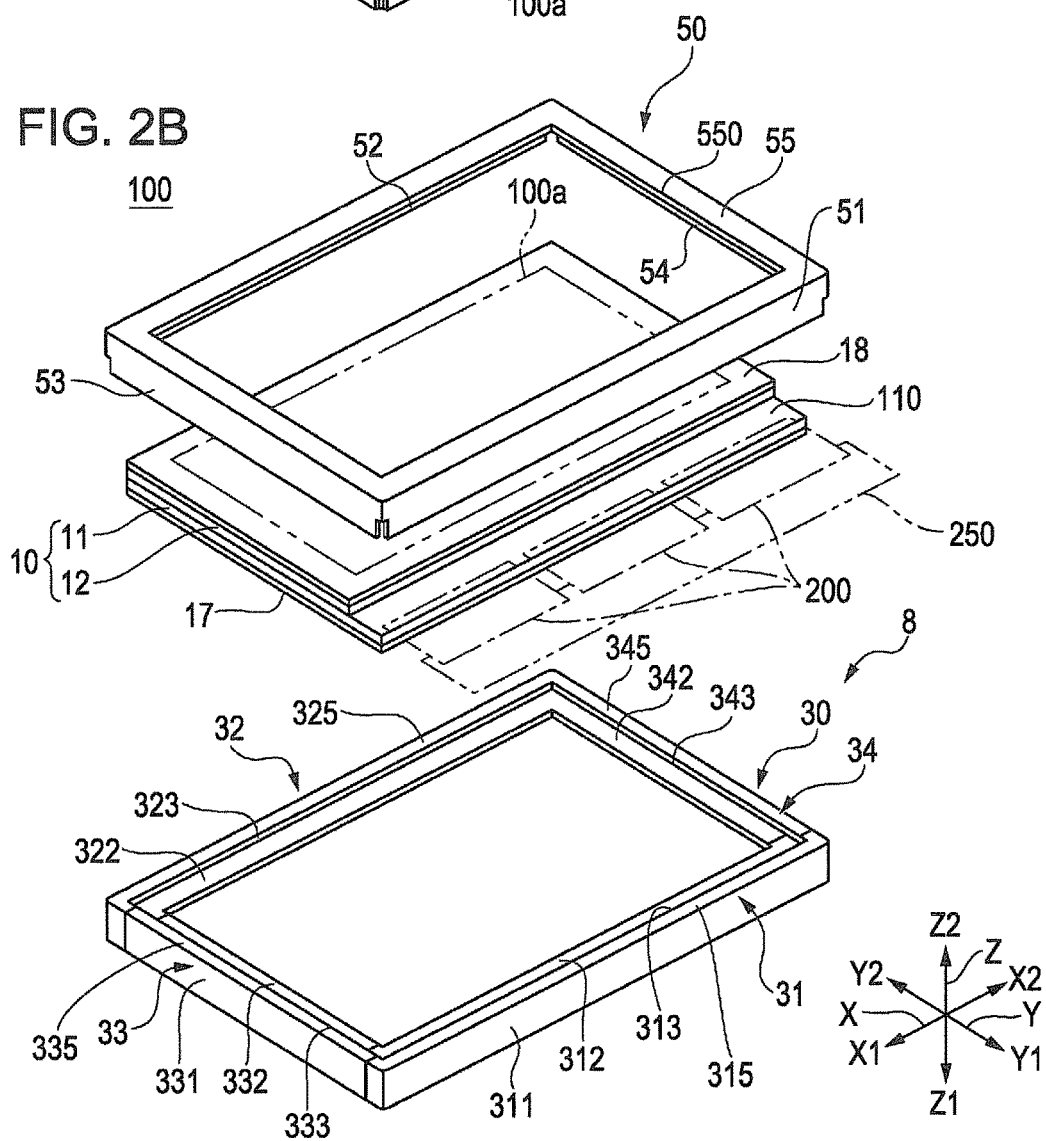

FIG. 8A
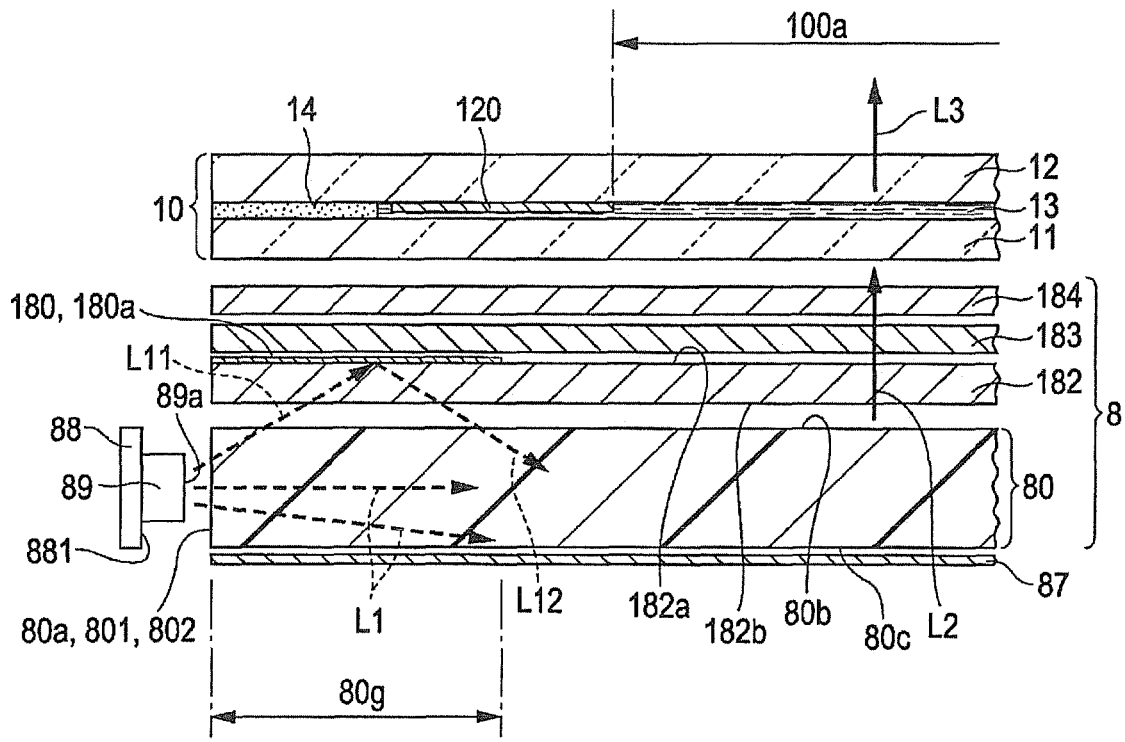
FIG. 8B
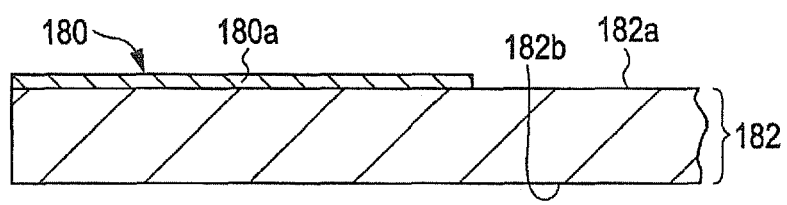
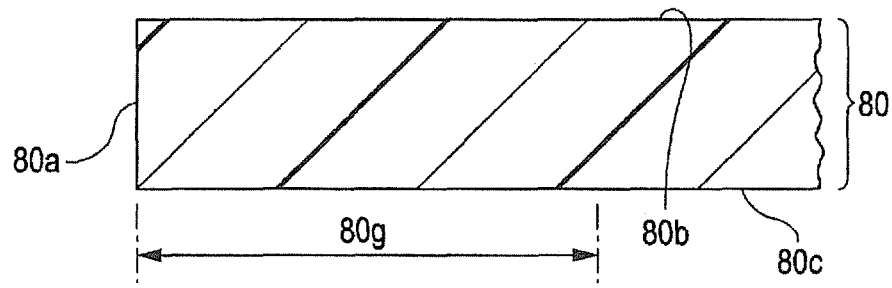

LIQUID CRYSTAL DISPLAY DEVICE AND ELECTRONIC APPARATUS

BACKGROUND

1. Technical Field

The present invention relates to a liquid crystal display device which is provided with a light guiding plate, a light source, and a liquid crystal panel and an electronic apparatus which is provided with the liquid crystal display device.

2. Related Art

Among the various types of display devices, a liquid crystal device provided with a transparent type of liquid crystal panel has a light guiding plate and a light source where a light emitting surface is directed toward a side edge surface which is a light incident section of the light guiding plate. The liquid crystal panel is arranged to overlap with the light emitting surface of the light guiding plate. In such a liquid crystal display device, after being incident from the side edge surface (light incident section) of the light guiding plate, the light which is emitted from the light source is emitted as illumination light from a light emitting surface while progressing within the light guiding plate and is modulated using the liquid crystal panel. In addition, between the liquid crystal panel and the light guiding plate, an optical sheet such as a diffusing sheet or a prism sheet is arranged so as to overlap and the uniformity of the intensity of the illumination light and the like is increased using the optical sheet.

In addition, a technique is proposed where a reflecting member with a rectangular frame shape is arranged between the diffusing sheet and the liquid crystal panel, leaking of light is prevented, and light which is to leak is incident in the light guiding plate and is used as illumination light (JP-A-11-149254).

In addition, a technique is proposed where a reflecting member which is separate to the optical sheet is provided at a position which overlaps with the light source at the side of the optical sheet, leaking of light is prevented, and light which is to leak is incident in the light guiding plate and is used as illumination light (JP-A-2009-38006 and JP-A-2003-270634).

However, as in JP-A-11-149254, in a case where the reflecting member with a rectangular frame shape is added between the optical sheet such as the diffusing sheet and the liquid crystal panel, there is a problem in that it takes time and effort to assemble the liquid crystal display device since it is necessary to provide the reflecting member while being careful so that the reflecting member does not extend out from the image display region of the liquid crystal panel. In addition, there is a concern that, even if the reflecting member is appropriately arranged during assembly, the reflecting member may be shifted and extend out from the image display region after assembly. Furthermore, when the reflecting member is arranged between the optical sheet and the liquid crystal panel in a case where a plurality of optical sheets are arranged, there is a problem in that the light which is reflected by the reflecting member passes through the optical sheets and significantly attenuates while returning in the light guiding plate and it is hardly possible to use any of the light as illumination light.

In addition, as in JP-A-2009-38006 and JP-A-2003-270634, considerable time and effort is taken in the arranging of the reflecting member in a configuration where the reflecting member which is separate to the optical sheet is provided to overlap with the light source at the side of the optical sheet. In addition, even if the light which is to leak is incident on the light guiding plate by being reflected at the reflecting member which overlaps with the light source, it is difficult for the light to be emitted as illumination light from the light emitting surface while progressing in the light guiding plate since the incident angle of the light toward the light guiding plate is extremely small.

SUMMARY

An advantage of some aspects of the invention is that there is provided a liquid crystal display device, which is able to use light which is to leak as illumination light by being returned in the light guiding plate without increasing the number of processes in assembly, and an electronic apparatus which is provided with the liquid crystal display device.

According to an aspect of the invention, there is provided liquid crystal display device including: a light guiding plate that has a plurality of edge surfaces; a light source that has a light emitting surface, the light source emits a light from the light emitting surface, the light emitted by the light source entering a first edge surface of the plurality of edge surfaces; and a liquid crystal panel which is arranged to overlap with a second edge surface of the plurality of edge surfaces from which the light emitted by the light source comes out; a optical sheet which is disposed between the liquid crystal panel and the light guiding plate, the optical sheet having a reflecting surface positioned at least at a periphery portion of the optical sheet which is corresponding side to the first edge surface.

According to the aspect of the invention, the reflecting surface is attached to the portion which overlaps with a periphery portion on a side where the light incident section of the light guiding plate is positioned in light guiding plate side of the optical sheet which is positioned farthest to the light guiding plate side among the plurality of optical sheets which are positioned to overlap each other between the light guiding plate and the liquid crystal panel. As a result, light which is emitted from the periphery portion of the light guiding plate is returned into the light guiding plate by being reflected at the reflecting surface, and after this, is emitted as illumination light from the light emitting surface while progressing in the light guiding plate. In addition, attenuation until the light which is reflected at the reflecting surface is returned in the light guiding plate is small since the reflecting surface is attached to light guiding plate side of the optical sheet which is positioned farthest to the light guiding plate side. Accordingly, according to the aspect of the invention, the efficiency where it is possible to use the light which is emitted from the light source as illumination light is high. In addition, the reflecting surface is also positioned if light guiding plate side of the optical sheet is positioned since the reflecting surface is attached to light guiding plate side of the optical sheet. Accordingly, different to the case where the reflecting member which is a separate body is used, the number of processes is not increased during assembly of the liquid crystal display device even if the reflecting surface is added. Furthermore, if at the optical sheet on the light guiding plate, it is possible to efficiently perform the process where the reflecting surface is provided compared to the light guiding plate.

It is preferable that the reflecting surface be attached to a surface on the light guiding plate side of light guiding plate side of the optical sheet. According to such a configuration, it is not necessary for the light which is reflected at the reflecting surface to pass through the optical sheet when returning into the light guiding plate since the optical sheet is not interposed between the reflecting surface and the light guiding plate. Therefore, it is possible to suppress the attenuation until the light which is reflected at the reflecting surface is returned in the light guiding plate to a minimum.

It is preferable that two side edge surfaces which oppose each other in the light guiding plate be the light incident sections and the reflecting surface be attached to a portion which overlaps with the periphery portion on both sides of the light guiding plate in light guiding plate side of the optical sheet.

It is preferable that the reflecting surface be formed from a reflecting layer which is formed onto the optical sheet.

In this case, it is preferable that the thickness of the reflecting layer be thinner than the thickness of the optical sheet. According to such a configuration, it is possible to prevent considerable warping of the optical sheets when the optical sheets are arranged to overlap even if the reflecting layer is provided.

It is preferable that the reflecting layer be formed from a layer which is white.

It is preferable that the reflecting layer be formed from a layer which has glossiness. In this case, it is possible to adopt a configuration where the reflecting layer is formed from a metal layer.

It is preferable that the reflecting layer be formed from a coating film, a transcription film, a sputtering film, a deposition film, and a member with a sheet shape.

It is preferable that the reflecting surface be formed from a smooth surface on light guiding plate side of the optical sheet. According to such a configuration, it is not necessary to laminate the reflecting layer onto light guiding plate side of the optical sheet since the boundary of the smooth surface on the optical sheet itself on the light guiding plate side and a layer of air functions as the reflecting surface. In addition, it is possible to prevent considerable warping of the optical sheets when the optical sheets are arranged to overlap.

According to another aspect of the invention, there is provided an electronic apparatus such as a liquid crystal television including the liquid crystal display device according to the aspect of the invention.

BRIEF DESCRIPTION OF THE DRAWINGS

The invention will be described with reference to the accompanying drawings, wherein like numbers reference like elements.

FIGS. 2A and 2B are explanatory diagrams illustrating an overall configuration of the liquid crystal display device according to the first embodiment of the invention.

FIGS. 8A and 8B are explanatory diagrams of a main portion of a liquid crystal display device according to a third embodiment of the invention.

DESCRIPTION OF EXEMPLARY EMBODIMENTS

Embodiments where the invention has been applied to a liquid crystal display device for a liquid crystal television will be described with reference to the diagrams. Here, the scale for each layer and each member differs in the diagrams which are referenced in the description below in order that each layer and each member is a size to the extent that recognition is possible in the diagram. In addition, in the description below, the directions which intersect each other in the direction of the surface of the light guiding plate and the liquid crystal panel are the X axial direction and the Y axial direction and the direction which is orthogonal to the X axial direction and the Y axial direction is the Z axial direction. In addition, in the diagrams which are referenced below, one side in the X axial direction is X1 side and the other side is X2 side, one side in the Y axial direction is Y1 side and the other side is Y2 side, and one side in the Z axial direction is Z1 side (lower side) and the other side (the side where the illumination light and the display light is emitted) is Z2 side (upper side).

First Embodiment

Overall Configuration

Figure 1A:
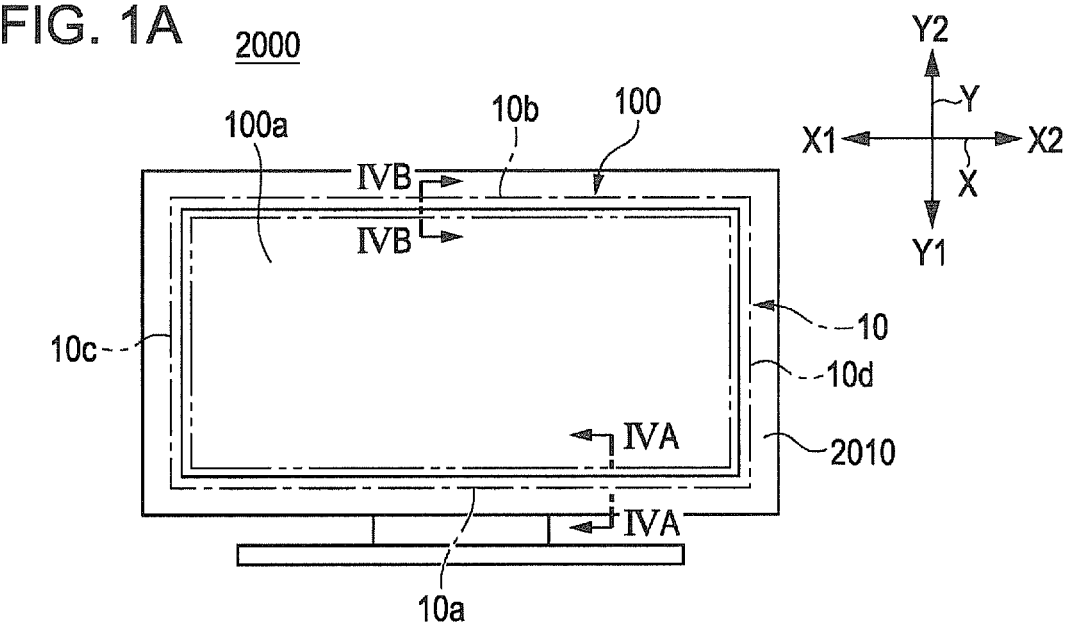
FIGS. 1A and 1B are explanatory diagrams of a liquid crystal television (an electronic apparatus) which is provided with a liquid crystal display device according to a first embodiment of the invention.
Figure 1B:
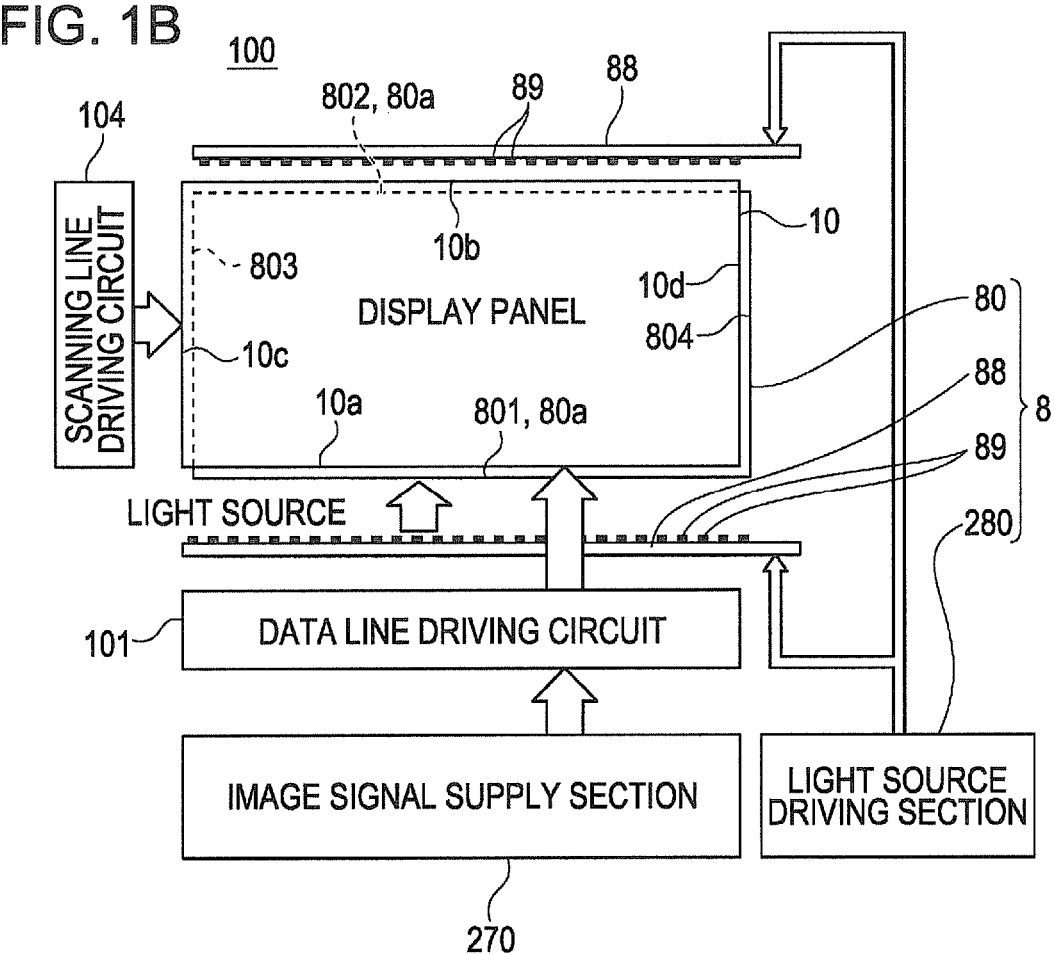

FIGS. 1A and 1B are explanatory diagrams of a liquid crystal television (an electronic apparatus) which is provided with a liquid crystal display device according to a first embodiment of the invention and FIGS. 1A and 1B are an explanatory diagram schematically illustrating an outer appearance of a liquid crystal television and a block diagram illustrating an electrical configuration of the liquid crystal display device.

An electronic apparatus 2000 illustrated in FIG. 1A is a liquid crystal television and has a liquid crystal display device 100, a frame 2010 for a television, and the like. The liquid crystal display device 100 has a liquid crystal panel 10 which will be described later, an image signal supply section 270 which supplies an image signal to the liquid crystal panel 10, and an illumination device 8 which supplies illumination light to the liquid crystal panel 10. In addition, the liquid crystal display device 100 has a scanning line driving circuit 104 which drives a scanning line which extends in the X axial direction in the liquid crystal panel 10 and a data line driving circuit 101 which drives a data line which extends in the Y axial direction in the liquid crystal panel 10. In regard to the scanning line driving circuit 104 and the data line driving circuit 101, it is possible to adopt a configuration where both are embedded in the liquid crystal panel 10. In addition, it is possible to adopt a configuration where one among the scanning line driving circuit 104 and the data line driving circuit 101 is embedded in the liquid crystal panel 10 and the other is embedded in a driving IC which is COG mounted in the liquid crystal panel 10. In addition, it is possible to adopt a configuration where one among the scanning line driving circuit 104 and the data line driving circuit 101 is embedded in the liquid crystal panel 10 and the other is embedded in a driving IC which is mounted in a circuit substrate which is electrically connected to the liquid crystal panel 10. Furthermore, it is possible to adopt a configuration where both of the scanning line driving circuit 104 and the data line driving circuit 101 are embedded in a driving IC which is a separate body to the liquid crystal panel 10.

In the embodiment, the illumination device 8 has a light guiding plate 80 which is arranged to overlap with the liquid crystal panel 10, a plurality of light emitting elements 89 which are arranged along the side edge surface which is a light incident section 80*a* among the side edge surfaces of the light guiding plate 80, a light source substrate 88 where the plurality of light emitting elements 89 is mounted, and a light source driving section 280 which drives the light emitting elements 89. In the embodiment, the liquid crystal panel 10 is a quadrangle shape and has four sides 10*a*, 10*b*, 10*c*, and 10*d*. Among the sides 10*a*, 10*b*, 10*c*, and 10*d*, the side 10*a* is a long side which is positioned on one side Y1 in the Y axial direction, the side 10*b* is a long side which is positioned on the other side Y2 in the Y axial direction, the side 10*c* is a short side which is positioned on one side X1 in the X axial direction, and the side 10*d* is a short side which is positioned on the other side X2 in the X axial direction. To correspond with such a formation, the light guiding plate 80 has four side edge surfaces 801, 802, 803, and 804. Among the side edge surfaces 801 to 804, the side edge surface 801 is positioned on the long side on one side Y1 in the Y axial direction, the side edge surface 802 is positioned on the long side on the other side Y2 in the Y axial direction, the side edge surface 803 is positioned on the short side on one side X1 in the X axial direction, and the side edge surface 804 is positioned on the short side on the other side X2 in the X axial direction. In the embodiment, among the four side edge surface 801, 802, 803, and 804 of the light guiding plate 80, the two side edge surfaces 801 and 802 which are opposed in the short side direction (the Y axial direction) are the light incident sections 80*a*. As a result, the light emitting elements 89 are arranged along the two side edge surfaces 801 and 802 (the light incident sections 80*a*) of the light guiding plate 80 and the light source substrate 88 extends along the two side edge surfaces 801 and 802 (the light incident sections 80*a*) of the light guiding plate 80.

Specific Configuration of Liquid Crystal Display Device 100

Figure 3:
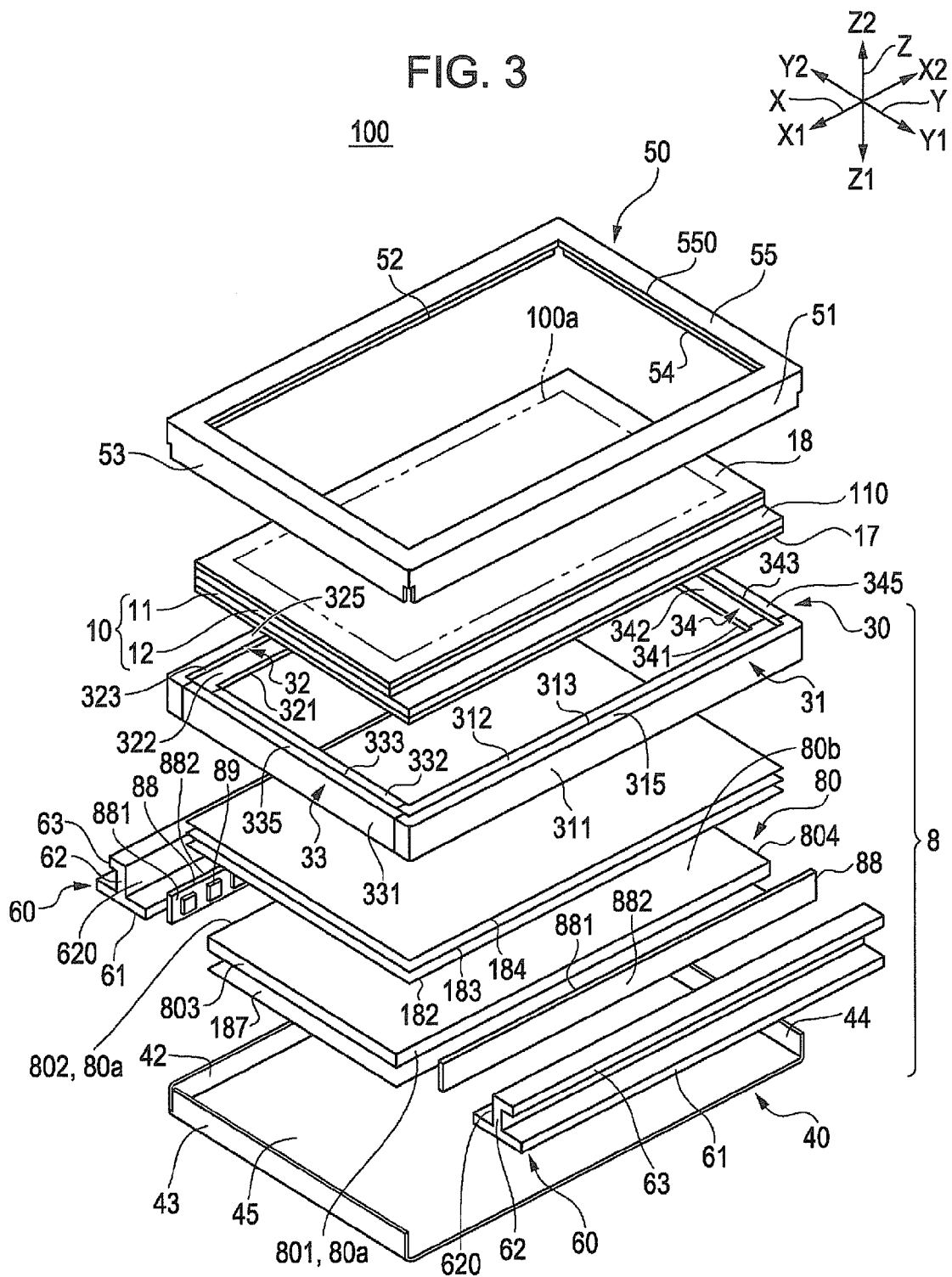
FIG. 3 is an exploded perspective diagram where there is a further breakdown of the liquid crystal display device according to the first embodiment of the invention.
Figure 4A:
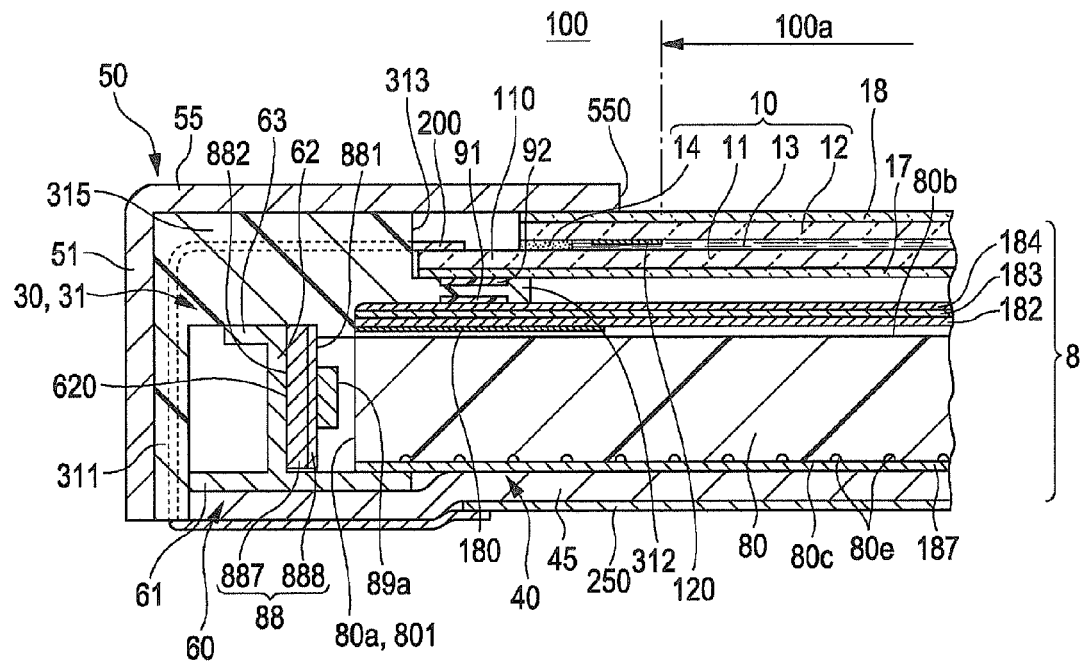
FIGS. 4A and 4B are cross-sectional diagrams of the liquid crystal display device according to the first embodiment of the invention.
Figure 4B:
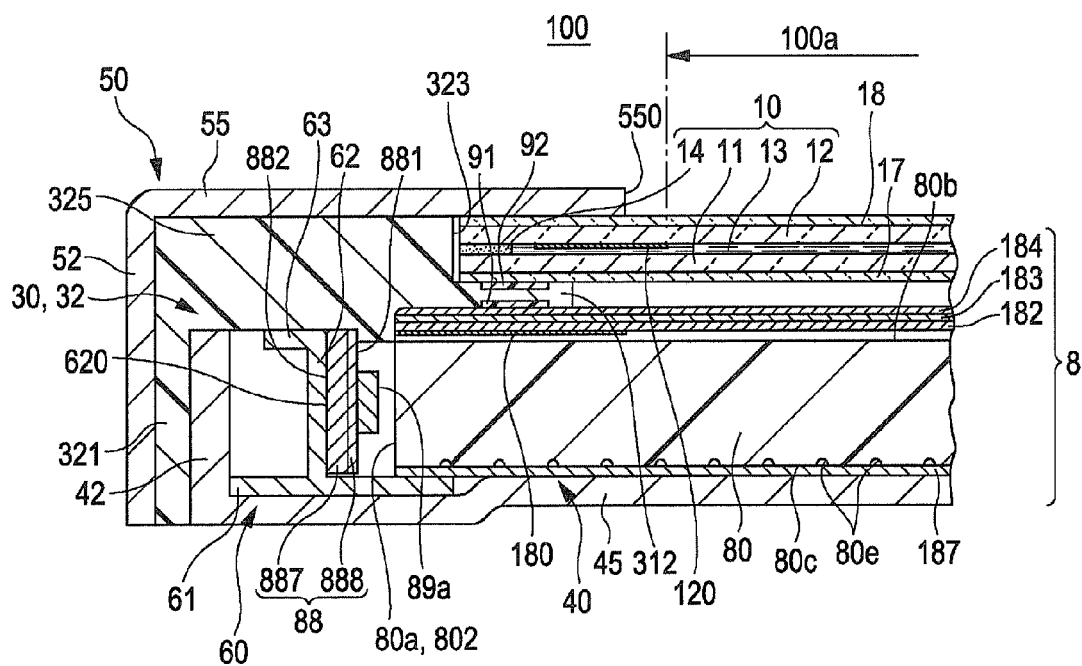

FIGS. 2A and 2B are explanatory diagrams illustrating an overall configuration of the liquid crystal display device 100 according to the first embodiment of the invention. FIGS. 2A and 2B are a perspective diagram and an exploded perspective diagram of the liquid crystal display device 100. FIG. 3 is an exploded perspective diagram where there is a further breakdown of the liquid crystal display device 100 according to the first embodiment of the invention. FIGS. 4A and 4B are cross-sectional diagrams of the liquid crystal display device 100 according to the first embodiment of the invention. FIGS. 4A and 4B are a cross-sectional diagram when the liquid crystal display device 100 is cut along a line IVA-IVA of FIG. 1A and a cross-sectional diagram when the liquid crystal display device 100 is cut along a line IVB-IVB of FIG. 1A.

In FIGS. 2A to 4B, the liquid crystal display device 100 of the embodiment is typically provided with the illumination device 8 which is referred to as a so-called back lighting device and the liquid crystal panel 10 which is a transparent type which is arranged to overlap with the upper surface of the illumination device 8. In the liquid crystal display device 100, the illumination device 8 is provided with a first frame 40 (lower metal frame) made from metal which is arranged to cover the rear surface of the light guiding plate 80 at a lower side (one side Z1 in the Z axial direction), a second frame 30 (resin frame) made of resin which holds the edge portion of the liquid crystal panel 10 above the first frame 40 and holds by surrounding the illumination device 8, and a third frame 50 (upper metal frame) made from metal which is arranged in the upper surface of the second frame 30 (the other side Z2 in the Z axial direction).

The second frame 30 has a rectangular frame shape which holds the edge portion of the liquid crystal panel 10 and surrounds the outside of the liquid crystal panel 10, and in the embodiment, the second frame 30 is formed from four frame plates 31, 32, 33, and 34 which are partitioned into each of the four sides of the liquid crystal panel 10. In the embodiment, the second frame 30 is black and prevents the generation of stray light in the illumination device 8 by functioning as a light absorption member. The frame plates 31, 32, 33, and 34 are respectively provided with side plate sections 311 to 341 which extend downward at the outer surface side of the frame plates 31, 32, 33, and 34, upper plate sections 315, 325, 335 and 345 (edge plate sections) which are bent toward the inner side from the upper edge of the side plate sections 311, 321, 331, and 341, and protruding plate sections 312, 322, 332, and 342 which extend to the inner side from an intermediate position in the height direction of upper plate sections 315, 325, 335, and 345. As a result, step sections 313, 323, 333, and 343 are formed due to the protruding plate sections 312, 322, 332, and 342 at the inner side of the frame plates 31 to 34 and the liquid crystal panel 10 is held by the step sections 313, 323, 333, and 343 and the protruding plate sections 312, 322, 332, and 342. In addition, the light guiding plate 80, the light emitting elements 89, and the like of the illumination device 8 are arranged at the lower side of the protruding plate sections 312, 322, 332, and 342.

The first frame 40 is formed by press processing or the like with regard to a metal plate which is thin such as an SUS plate. The first frame 40 is provided with a bottom plate section 45 and three side plate sections 42 to 44 which rise up from three sides excluding the one side Y1 in the Y axial direction among the outer periphery edge of the bottom plate section 45 and is a rectangular box shape where the upper surface is open. The side plate sections 321, 331, and 341 of the second frame 30 overlap at the outer side of the side plate sections 42 to 44 of the first frame 40. In addition, the side plate section 311 of the second frame 30 covers the one side Y1 in the Y axial direction of the first frame 40.

In the same manner as the first frame 40, the third frame 50 is also formed by press processing or the like with regard to a metal plate which is thin such as an SUS plate. The third frame 50 is provided with a rectangular upper plate section 55 (edge plate section) and four side plate sections 51 to 54 which are curved downward from the outer periphery edge of the upper plate section 55 and is a rectangular box shape where the lower surface is open. The side plate sections 51 to 54 overlap by covering the outer side of the side plate sections 311, 321, 331, and 341 of the second frame 30. A rectangular window 550, where light which is emitted from the liquid crystal panel 10 is emitted, is formed in the upper plate section 55 and the upper plate section 55 covers the outer periphery edge section over the entire periphery among the display light emitting side of the liquid crystal panel 10. In addition, at the same time, the upper plate section 55 of the third frame 50 is set to completely cover above the upper plate sections 315, 325, 335, and 345 (edge plate sections) of the second frame 30.

The third frame 50, the second frame 30, and the first frame 40 which are configured in this manner are combined using screws (not shown) or the like and hold the liquid crystal panel 10 and the illumination device 8 at the inner side. Here, flexible sheets 91 and 92 are bonded to the lower surface and the upper surface of the protruding plate sections 312, 322, 332, and 342 of the second frame 30 as shown in FIGS. 4A and 4B. As a result, when the liquid crystal display device 100 is being assembled, the liquid crystal panel 10 is supported by the protruding plate sections 312, 322, 332, and 342 via the flexible sheet 92. In addition, when the liquid crystal display device 100 is being assembled, the optical sheet (a dispersion sheet 182, prism sheets 183 and 184, and the like) of the illumination device 8 are pressed so that lifting or positional deviation does not occur through the flexible sheet 91.

Configuration of Liquid Crystal Panel 10

As shown in FIGS. 2A to 4B, the liquid crystal panel 10 has a planar form with a quadrangle shape and is provided with an element substrate 11 where a pixel electrode (not shown) or the like is formed, an opposing substrate 12 which is arranged so as to oppose via a predetermined gap with regard to the element substrate 11, and a seal material 14 with a rectangular frame shape which bonds the opposing substrate 12 and the element substrate 11. A liquid crystal layer 13 is held in a region which is surrounded by the seal material 14 in the liquid crystal panel 10. The element substrate 11 and the opposing substrate 12 are formed from transparent substrates such as glass substrates. In the element substrate 11, while a plurality of scanning lines (not shown) extend in the X axial direction, a plurality of data lines (not shown) extend in the Y axial direction and switching elements (not shown) and pixel electrodes (not shown) are provided to correspond to the intersections of the scanning lines and the data lines.

In the embodiment, the opposing substrate 12 is arranged on the emitting side of the display light and the element substrate 11 is arranged on the side of the illumination device 8. In addition, in the opposing substrate 12, a frame edge layer 120 formed from a light blocking layer with a rectangular frame shape is formed along the inner edge of the four sides of the seal material 14 in the surface which opposes the element substrate 11 and the region which is specified by the inner edge of the frame edge layer 120 is an image display region 100a. Here, the inner edge of the upper plate section 55 of the third frame 50 is in an intermediate position in the width direction in the frame edge layer 120 and the window 550 of the third frame 50 overlaps with the image display region 100a and the inner edge portion of the frame edge layer 120.

The liquid crystal panel 10 is configured as a liquid crystal panel with a TN (Twisted Nematic) method, an ECB (Electrically Controlled Birefringence) method, or a VAN (Vertical Aligned Nematic) method, a pixel electrode is formed in the element substrate 11, and a common electrode (not shown) is formed in the opposing substrate 12. Here, in a case where the liquid crystal panel 10 is a liquid crystal panel with an IPS (In Plane Switching) method or a FFS (Fringe Field Switching) method, the common electrode is provided at the side of the element substrate 11. In addition, the element substrate 11 is arranged at the emitting side of the display light with regard to the opposing substrate 12. An upper polarization plate 18 is arranged to overlap in the upper surface of the liquid crystal panel 10 and a lower polarization plate 17 is arranged between the lower surface of the liquid crystal panel 10 and the illumination device 8.

In the embodiment, the element substrate 11 is larger than the opposing substrate 12. As a result, the element substrate 11 has a protruding section 110 which protrudes from an edge portion of the opposing substrate 12 in the one side Y1 in the Y axial direction and a flexible wiring substrate 200 is connected in the upper surface of the protruding section 110. The flexible wiring substrate 200 has a configuration where a plurality of flexible wiring substrates are connected, and a control IC (not shown) which configures the image signal supply section 270 which was described with reference to FIGS. 1A and 1B and a light source driving IC (not shown) which configures the light source driving section 280 are mounted in the flexible wiring substrate 200.

Configuration of Illumination Device 8

Figure 5A:
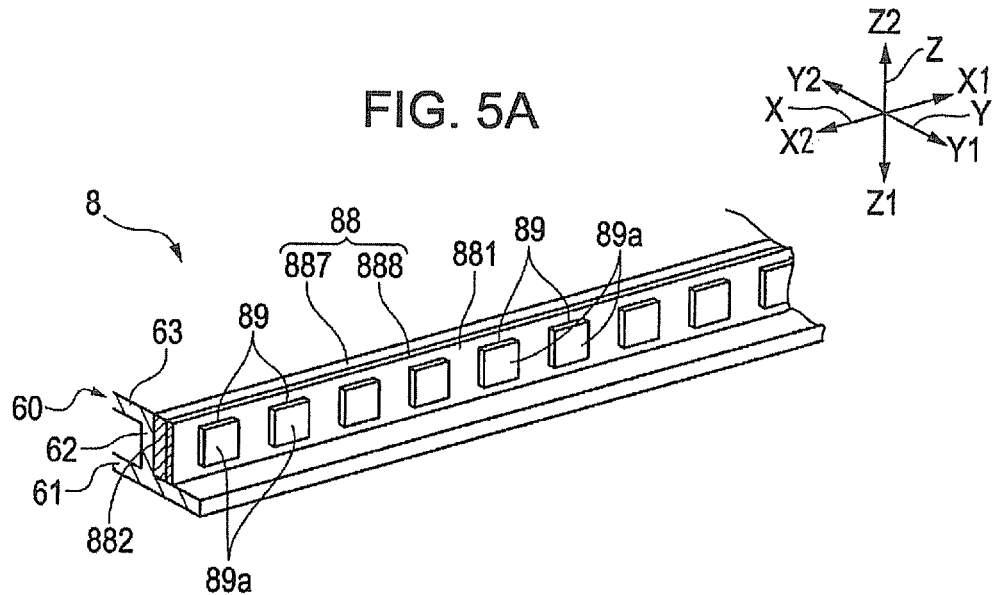
FIGS. 5A and 5B are explanatory diagrams illustrating a configuration of the surroundings of a light source substrate which is used in an illumination device of the liquid crystal display device according to the first embodiment of the invention.
Figure 5B:
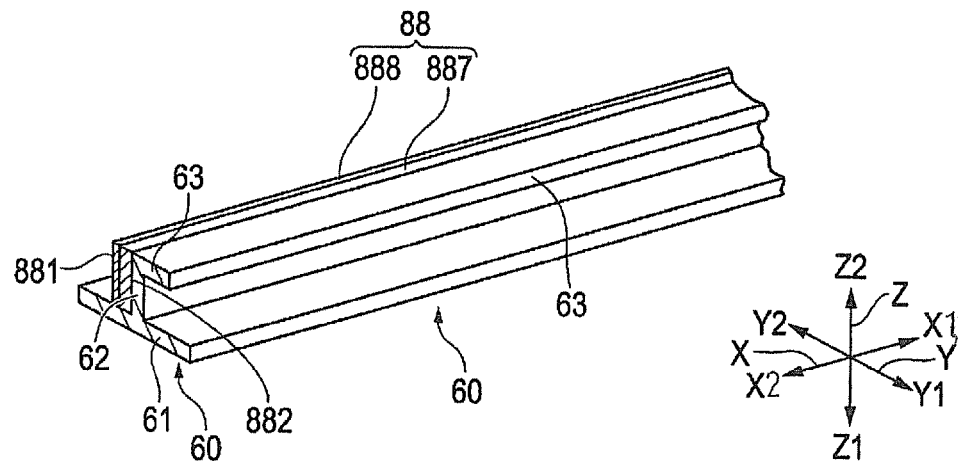

FIGS. 5A and 5B are explanatory diagrams illustrating a configuration of the surroundings of the light source substrate 88 which is used in the illumination device 8 of the liquid crystal display device 100 according to the first embodiment of the invention, and FIGS. 5A and 5B are an explanatory diagram schematically illustrating an appearance of one side surface 881 side of the light source substrate 88 and an explanatory diagram schematically illustrating an appearance of the other side surface 882 side of the light source substrate 88. Here, the configuration of the light emitting element 89 and the light source substrate 88, which are arranged in the two side edge surfaces 801 and 802 (the light incident sections 80a) which oppose each other in the Y axial direction of the light guiding plate 80, are the same. Accordingly, the light emitting element 89 and the light source substrate 88 which are arranged on the side edge surface 802 of the light guiding plate 80 are shown in FIG. 5A and the light source substrate 88 and the like which are arranged on the side edge surface 801 of the light guiding plate 80 are shown in FIG. 5B.

As shown in FIGS. 3 to 4B, the illumination device 8 is provided with the light guiding plate 80 which is arranged to overlap with the lower surface side of the liquid crystal panel 10 and the plurality of light emitting elements 89 which are lined up from one edge side of the light incident section 80a (the one side X1 in the X axial direction) toward the other edge side (the other side X2 in the X axial direction) by the light emitting surface 89a facing the light incident sections 80a of the light guiding plate 80. In the embodiment, the plurality of the light emitting elements 89 are mounted on the one surface 881 of the light source substrate 88 which extends in the X axial direction along the light incident section 80a. The light emitting elements 89 are LEDs (Light Emitting Diodes) which emits white light and emits the light source light as scattered light.

In the illumination device 8 of the embodiment, the two side edge surfaces 801 and 802 which oppose each other in the Y axial direction among the side edge surfaces 801, 802, 803, and 804 of the light guiding plate 80 are used as the light incident sections 80a. As a result, the plurality of light emitting elements 89 are lined up toward a light emitting surface 89a in the two light incident sections 80a (the side edge surfaces 801 and 802) of the light guiding plate 80 and from one edge side of each of the two light incident sections 80a (the side edge surfaces 801 and 802) toward the other edge side. In addition, two of the light source substrates 88 extend along the two light incident sections 80a (the side edge surfaces 801 and 802) and the plurality of light emitting elements 89 are mounted on each of the one sides 881 of the two light source substrate 88.

In the embodiment, the light guiding plate 80 is a resin plate with transparency which is formed from an acrylic resin, a polycarbonate resin, or the like and a reflecting sheet 187 is arranged to overlap between a lower surface 80c of the light guiding plate 80 and the bottom plate section 45 of the first frame 40.

In addition, optical sheets such as the diffusing sheet 182 and the prism sheets 183 and 184 are arranged to overlap between the upper surface (light emitting surface 80b) of the light guiding plate 80 and the liquid crystal panel 10. The dispersing sheet 182 is formed from a sheet which is provided with a coating layer where silica particles and the like have been dispersed in a transparent resin such as an acrylic resin, a polycarbonate resin, or the like. In the embodiment, the two prism sheets 183 and 184 are arranged so that the ridge lines intersect each other. As a result, directionality is applied to the illumination light which is emitted from the light emitting surface 80b of the light guiding plate 80 by the two prism sheets 183 and 184 after being dispersed into all directions by the dispersing sheet 182 so that there is a peak in the front direction of the liquid crystal panels 10. In the light guiding plate 80, a dispersing pattern formed from fine indents with a concave shape and a printing layer of a dispersing member is formed in a lower surface 80c which is the surface on the side where the reflecting sheet 187 is positioned, and in the embodiment, the density of the dispersing pattern increases along with separation from the light emitting elements 89. As a result, the intensity distribution of the illumination light which is emitted from the light guiding plate 80 is uniformized irrespective of separation from the light emitting elements 89. As the dispersing patter, a plurality of fine concave sections 80e are provided in the lower surface 80c of the light guiding plate 80 in the embodiment.

In the bottom plate section 45 of the first frame 40, steps are partially formed so that it is possible to secure a gap between the lower surface 80c of the light guiding plate 80 and the first frame 40 in a region which overlaps with the sides where the side edge surfaces 801 and 802 which are the light incident surfaces 80a are positioned in the light guiding plate 80 and are curved toward the light guiding plate 80. Due to this, it is possible to interpose the reflecting sheet 187 and a lower plate section 61 of a light source supporting member 60 in the gap between the lower surface 80c of the light guiding plate 80 and the bottom plate section 45. In addition, since a concave section is formed in the rear surface side of the first frame 40 due to that the bottom plate section 45 of the first frame 40 is partially curved toward the light guiding plate 80, the flexible wiring substrate 200 is curved and extends to the lower surface (rear surface) of the bottom plate section 45 of the first frame 40 and a circuit substrate 250 is arranged in the concave section so as to be contained in the depth of the concave section. As a result, it is possible to achieve a reduction in the thickness of the illumination device 8.

In the embodiment, the light source substrate 88 is arranged so that one surface 881 where the light emitting elements 89 are mounted opposes the light incident section 80a of the light guiding plate 80. In addition, the light source substrate 88 has a configuration where a wiring pattern and a land are provided with an insulation layer in the one surface 881 of a metal plate 887 with a plate shape which extends along the light incident section 80a. The configuration is able to be realized by, for example, a flexible wiring substrate 888 where a resin substrate layer, a wiring pattern, an insulation and protection layer, and the like are laminated in this order being bonded to the one surface 881 of the metal plate 887. Accordingly, the land where the metal plate 887, the wiring pattern, and a chip of the light emitting elements 89 are mounted secures electrical insulation. In the embodiment, the metal plate 887 is formed from an aluminum plate and the metal plate 887 ensures the mechanical strength of the light source substrate 88 and functions as a heat releasing plate of heat which is generated from the light emitting elements 89.

As shown in FIGS. 3 to 5B, the light source supporting members 60 which hold the light source substrate 88 are each arranged between each of the other surfaces 882 of the two light source substrates 88 and the light source support members 60 is held by being arranged between the first frame 40 and the second frame 30. In the embodiment, the light source supporting members 60 are metal parts with rod shapes which extend along the other surface 882 of the light source substrate 88 and are fixed by being closely adhered in a surface contact state of the entire surface of the other surface 882 of the light source substrate 88 and a substrate holding surface 620 of a supporting plate section 62. In addition, the light source supporting member 60 has a lower plate section 61 which overlaps with the bottom plate section 45 of the first frame 40 and the supporting plate section 62 which is configured of a wall surface which protrudes upwards from an intermediate position of the lower plate section 61 in the width direction. In addition, the light source supporting member 60 is provided with an upper plate section 63, which is curved to the side opposite to the side from the supporting plate section 62 where the light guiding plate 80 is positioned, in an upper edge side of the support plate section 62 (the side which is opposite to the lower plate section 61) and the upper plate section 63 is fixed to at least one of any of the upper plate section 55 of the third frame 50 or the upper plate sections 315 or 325 of the second frame 30 using a screw or the like.

In the light source supporting member 60 in this configuration, a surface on a side of the supporting plate section 62 which is positioned on the light guiding plate 80 is the substrate holding surface 620 which holds the light source substrate 88 and the light source substrate 88 is fixed to the substrate holding surface 620 using a screw or the like. In this state, the other surface 882 (metal plate 887) of the light source substrate 88 overlaps with the substrate holding surface 620 of the light source supporting member 60. In addition, the light source supporting member 60 is made of metal such as aluminum or an iron-based metal. As a result, the heat which is generated by the light emitting elements 89 is transferred to the light source supporting member 60 from the metal plate 887 of the light source substrate 88 and the heat in the light source supporting member 60 is transferred to the first frame 40. Accordingly, it is possible to suppress increases in temperature in the light emitting elements 89 to be low.

Configuration of Periphery of Dispersion Sheet 182

Figure 6A:
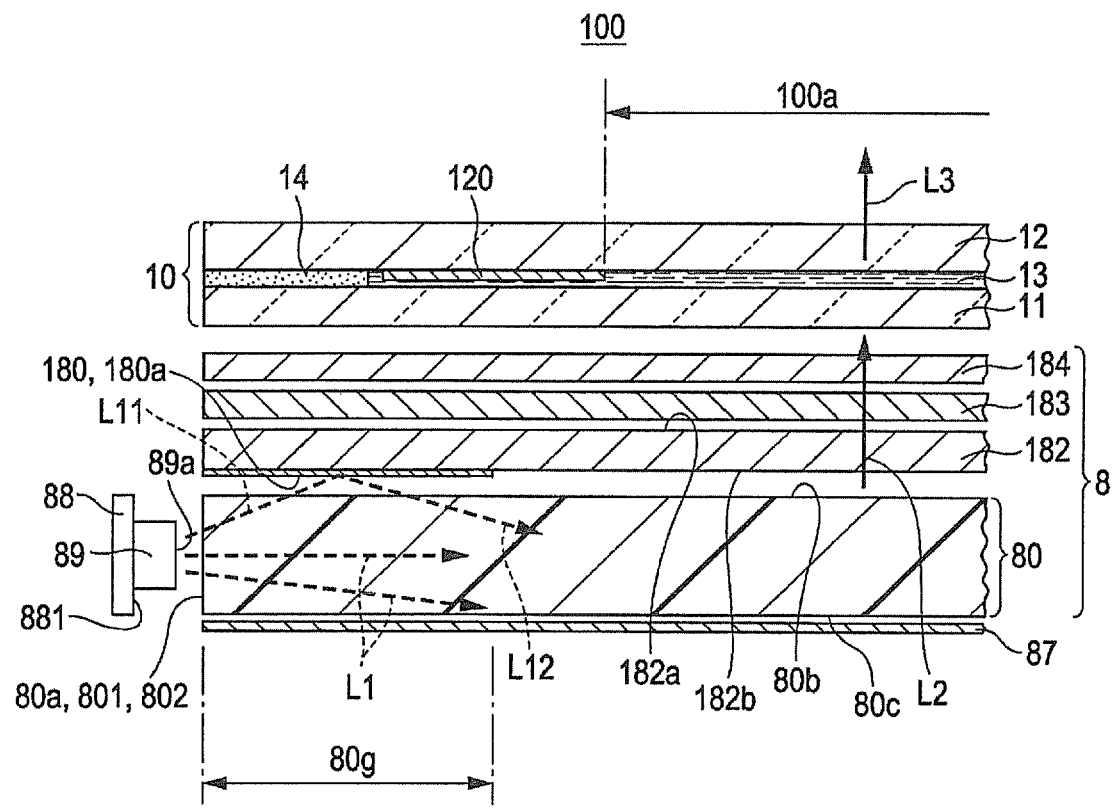
FIGS. 6A and 6B are explanatory diagrams of a main portion of the liquid crystal display device according to the first embodiment of the invention.
Figure 6B:
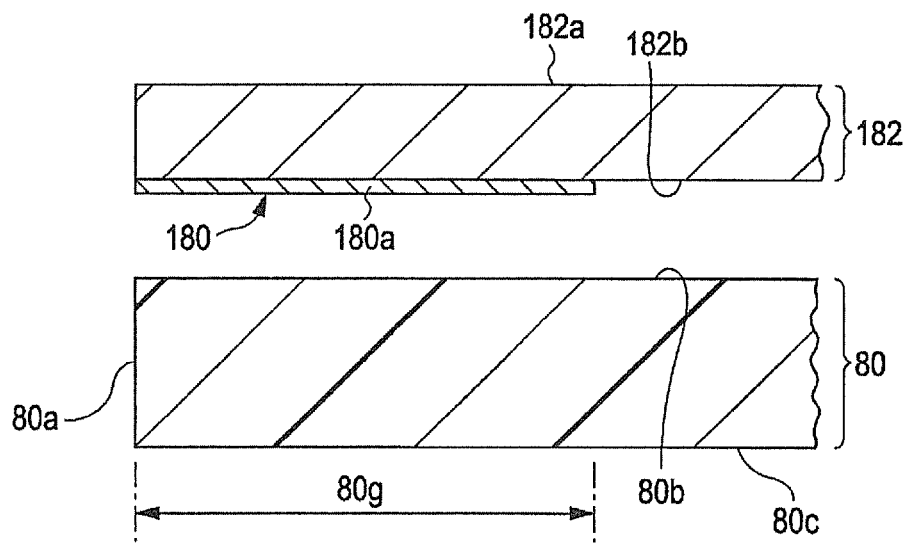

FIGS. 6A and 6B are explanatory diagrams of a main portion of the liquid crystal display device 100 according to the first embodiment of the invention, and FIGS. 6A and 6B are an explanatory diagram schematically illustrating a cross section of an edge portion of the liquid crystal display device 100 and an explanatory diagram schematically illustrating a cross section of an edge portion of the dispersion sheet 182. Here, the diagrammatical representation of the lower polarization plate 17 and the upper polarization plate 18 are not included in FIGS. 6A and 6B.

As shown in FIGS. 6A and 6B, in the liquid crystal display device 100 of the embodiment, the light which is emitted from the light emitting elements 89 is transmitted through the inner section of the light guiding plate 80 after having been incident from the light incident section 80a as shown by the arrow L1, is dispersed by the dispersion pattern which is formed on the lower surface 80c of the light guiding plate 80, and is emitted as illumination light from the light emitting surface 80b as shown by the arrow L2. Then, after having been dispersed in all directions by the dispersing sheet 182, the illumination light is incident on the image display region 100a of the liquid crystal panel 10 after the directionality is applied so that there is a peak in the front direction of the liquid crystal panel 10 using the two prism sheets 183 and 184 and is emitted as display light as shown by the arrow L3 after having been modulated using the liquid crystal panel 10. The image display region 100a is formed at an inner edge of the frame edge layer 120 which is formed in the opposing substrate 12.

When an image is displayed in this manner, directionality is applied to the light, which is emitted from a periphery portion 80g where the light incident section 80a is positioned in the light guiding plate 80 as shown by the arrow L11 among the light which is incident in the light guiding plate 80 from the light incident section 80a, so that there is a peak in the front direction of the liquid crystal panel 10 using the two prism sheets 183 and 184 after having been dispersed in all directions using the dispersing sheet 182 in a case where there is no reflecting surface 180, and the light reaches the frame edge layer 120 without reaching the image display region 100a and does not contribute to display. Therefore, in the embodiment, in the dispersing sheet 182 (light guiding plate side of the optical sheet) which is positioned on farthest to the light guiding plate 80 side (the side which directly opposes the light emitting surface 80b of the light guiding plate 80) among the plurality of optical sheets which are formed from the dispersing sheet 182 and the prism sheets 183 and 184, a reflecting surface 180 is attached to a portion which overlaps with the periphery portion 80g on the side of the light guiding surface 80 where the light incident section 80a is positioned and the reflecting surface 180 reflects the light which is incident from the side of the light guiding plate 80 toward the light guiding plate 80 side. Here, the width dimension in the Y axial direction of the reflecting surface 180 is set to be narrower than the gap (width dimension) from the edge section of the liquid crystal panel 10 to the edge section of the frame edge layer 120 on the image display region 100a side.

In the embodiment, the reflecting surface 180 is attached to a surface 182b on the light guiding plate 80 side among two surfaces 182a and 182b of the dispersing sheet 182. In addition, a reflecting layer 180a is formed with a width dimension from the edge section of the dispersing sheet 182 to an intermediate position of the frame edge layer 120 in the width direction. In addition, since the two side edge surfaces 801 and 802 which oppose each other in the light guiding path 80 are the light incident sections 80a, the reflecting surface 180 is attached to a portion in the dispersing sheet 182 which overlaps with the periphery portions 80g on both sides of the light guiding plate 80. That is, the reflecting surface 180 is formed in a stripe shape along both edge sections which oppose each other in the dispersing sheet 182. Here, the reflecting surface 180 may be formed with a rectangular frame shape which spans the entire periphery of the dispersing sheet 182.

In configuring the reflecting surface 180 in this manner, in the embodiment, the reflecting surface 180 is configured by the reflecting layer 180a which is laminated onto the dispersing sheet 182 and the surface side of the reflecting layer 180a which opposes the periphery portion 80g of the light guiding plate 80 is the reflecting surface 180. Here, the reflecting layer 180a is formed with a thickness which is thinner than the thickness of the dispersing sheet 182.

As the reflecting layer 180a, it is possible to use a white layer which is formed from a coating film, a transcription film, a sputtering film, or a deposition film. For example, if a coating of a white coating material, transferring of a white film, or a sputtering film or a deposition film which is a white layer such as a metal oxide is used, it is possible to form the reflecting layer 180a which is formed from a white film. In addition, it is possible to form the white layer using a white sheet member which is bonded to the dispersing sheet 182, for example, a white PET (Polyethylene Terephthalate) sheet or the like.

In addition, as the reflecting layer 180a, it is possible to use a layer which has glossiness. The layer which has glossiness is, for example, a metal film such as an aluminum film, an aluminum alloy film, a silver film, or a silver alloy film. The layer which has glossiness is also able to be formed as a coating film, a sputtering film, or a deposition film. In addition, it is possible to form the layer which has glossiness using a metal sheet (a member with a sheet shape) which is bonded to the dispersing sheet 182.

Here, as shown in FIGS. 4A, 4B, and the like, in the embodiment, both the side edge surfaces 801 and 802 of the light guiding plate 80 are the light incident surfaces 80a, but a configuration may be adopted where either of the side edge surfaces 801 or 802 is the light incident surface 80a. For example, a configuration may be adopted where only the side edge surface 801 is the light incident section 80a and the side edge surface 802 is not the light incident surface 80a. Even in such a case, the reflecting surface 180 may be provided on the side of the side edge surface 802 as shown in FIG. 4B, and in this case, the width dimension in the Y axial direction of the reflecting surface 180 which is provided on the side of the side edge surface 802 is set to be narrower than the width dimension in the Y axial direction of the reflecting surface 180 which is provided on the side of the side edge surface 801 as shown in FIG. 4A.

Main Effects of the Embodiment

As described above, in the liquid crystal display device 100 of the embodiment, the light which is emitted from the periphery portion 80g of the light guiding plate 80 (the arrow L11 in FIG. 6A) does not essentially contribute to display, but in the embodiment, the reflecting surface 180 is attached to the portion, which overlaps with the periphery portion 80g of the light guiding plate 80 side where the light incident section 80a is positioned, in the dispersing sheet 182 (light guiding plate side of the optical sheet) which is positioned farthest to the light guiding plate 80 side among the plurality of optical sheets which are arranged to overlap between the light guiding plate 80 and the liquid crystal panel 10. As a result, the light (the arrow L11 in FIG. 6A) which is emitted from the periphery portion 80g of the light guiding plate 80 is returned into the light guiding plate 80 by being reflected by the reflecting surface 180 as shown by the arrow L12 in FIG. 6A, and after this, is emitted as illumination light from the light emitting surface 80b while progressing within the light guiding plate 80. In addition, since the reflecting surface 180 is attached to the dispersing sheet 182 which is positioned farthest to the light guiding plate 80 side, the attenuation of the light which is reflected by the reflecting surface 180 until returning into the light guiding plate 80 is small. Accordingly, according to the embodiment, the efficiency where the light which is emitted from the light emitting elements 89 (light sources) is used as illumination light is high.

In addition, since the reflecting surface 180 is attached to the dispersing sheet 182, the reflecting surface 180 is also positioned if the dispersing sheet 182 is positioned using the second frame 30 and the like. Accordingly, different to the case where a reflecting member which is a separate body is used, the number of processes when the liquid crystal display device 100 is assembled does not increase even if the reflecting surface 180 is added.

Furthermore, it is possible to effectively perform the process of providing the reflecting surface 180 if there is the dispersing sheet 182 compared to a case where a reflecting surface is attached to the light guiding plate 80. For example, since the dispersing sheet 182 is manufactured as a sheet with long sides, it is possible to form the reflecting surface 180 in a state of the dispersing sheet 182 with long sides during the manufacturing of the dispersing sheet 182 or after the dispersing sheet 182 has been manufactured, and after that, to use the dispersing sheet 182 with long sides by cutting into predetermined dimensions. Therefore, it is possible to efficiently manufacture the dispersing sheet 182 where the reflecting surface 180 is provided. In addition, since it is not bulky and is light compared to the light guiding plate 80 if there is the dispersing sheet 182, it is possible to efficiently perform the process of providing the reflecting surface 180 if there is the dispersing sheet 182 compared to the light guiding plate 80.

In addition, the reflecting surface 180 is attached to the surface 182b on the light guiding plate 80 side of the dispersing sheet 182. As a result, since there is not an optical sheet between the reflecting surface 180 and the light guiding plate 80, it is not necessary that the light which is reflected by the reflecting surface 180 passes through the optical sheets when returning into the light guiding plate 80. Therefore, it is possible to suppress the attenuation of the light which is reflected by the reflecting surface 180 until returning into the light guiding plate 80 to be as small as possible. Therefore, it is possible to efficiently use the light which is reflected by the reflecting surface 180 as illumination light.

Furthermore, in the forming of the reflecting surface 180 using the reflecting layer 180a, the thickness of the reflecting layer 180a is thinner than the thickness of the dispersing sheet 182. As a result, it is possible to prevent considerable warping of the optical sheets when the optical sheets of the dispersing sheet 182 and the prism sheets 183 and 184 are arranged to overlap even when the reflecting layer 180a is provided.

Second Embodiment

Figure 7A:
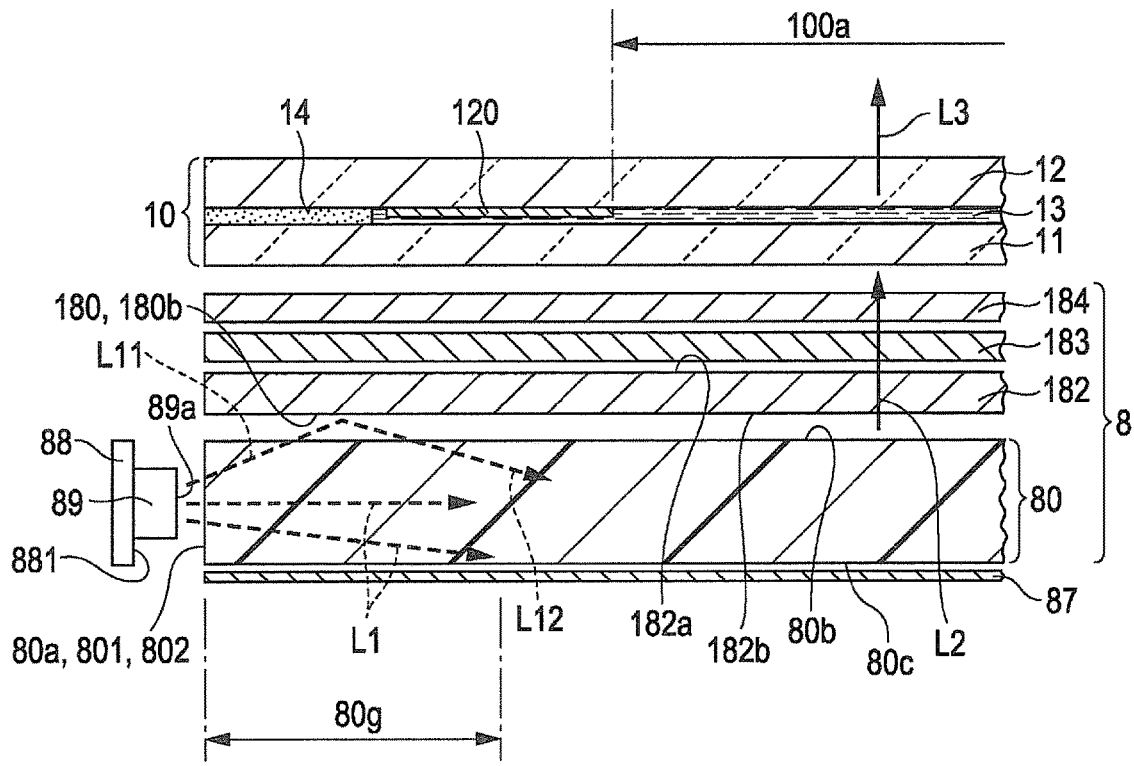
FIGS. 7A and 7B are explanatory diagrams of a main portion of a liquid crystal display device according to a second embodiment of the invention.
Figure 7B:
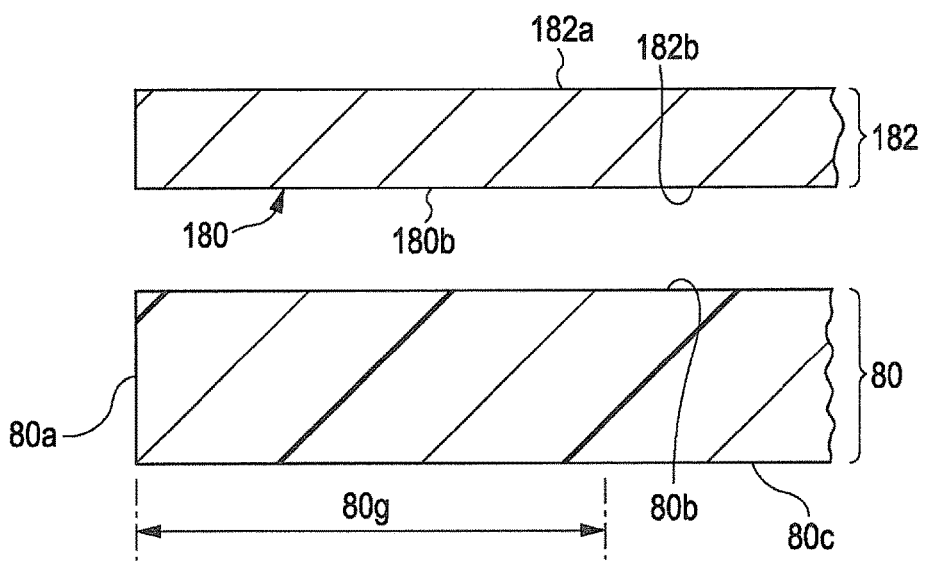

FIGS. 7A and 7B are explanatory diagrams of a main portion of the liquid crystal display device 100 according to a second embodiment of the invention, and FIGS. 7A and 7B are an explanatory diagram schematically illustrating a cross section of an edge portion of the liquid crystal display device 100 and an explanatory diagram schematically illustrating a cross section of an edge portion of the dispersing sheet 182. Here, since the basic configuration of the embodiment is the same as the first embodiment, common portions have the same reference numeral attached and the description thereof is omitted. In addition, the diagrammatical representation of the lower polarization plate 17 and the upper polarization plate 18 is not included in FIGS. 7A and 7B.

As shown in FIGS. 7A and 7B, even in the liquid crystal display device 100 of the embodiment, the reflecting surface 180 is attached to the portion, which overlaps with the periphery portion 80g of the light guiding plate 80, in the dispersing sheet 182 (light guiding plate side of the optical sheet) which is positioned farthest to the light guiding plate 80 side among the plurality of optical sheets which are formed from the dispersing sheet 182 and the prisms sheets 183 and 184 in the same manner as the first embodiment. The reflecting surface 180 reflects the light which is incident from the side of the light guiding plate 80 toward the light guiding plate 80. In addition, the reflecting sheet 180 is attached to the surface 182b on the light guiding plate 80 side among the two surfaces 182a and 182b of the dispersing sheet 182 in the same manner as the first embodiment.

In the configuring of the reflecting surface 180 in this manner, in the embodiment, the portion which overlaps with the periphery portion 80g of the light guiding plate 80 in the surface 182b of the dispersing sheet 182 on the light guiding plate 80 side is set as a smooth surface 180b. The boundary of the smooth surface 180b and the air layer functions as the reflecting surface 180 since the refractive index of both is different. That is, in the embodiment, the smooth surface 180b is set so that the roughness of the surface is small so that surface reflectivity is increased more than the surface of the other portions of the dispersing sheet 182. Since the other configurations are the same as the first embodiment, the description is not included.

Even with the liquid crystal display device 100 of the embodiment, the light (the arrow L11 in FIG. 7A) which is emitted from the periphery portion 80g of the light guiding plate 80 is returned into the light guiding plate 80 by being reflected by the reflecting surface 180 as shown by the arrow L12 in FIG. 7A, and after this, is emitted as illumination light from the light emitting surface 80b while progressing within the light guiding plate 80 in the same manner as the first embodiment. In addition, since the reflecting surface 180 is attached to the dispersing sheet 182 which is positioned farthest to the light guiding plate 80 side, the attenuation of the light which is reflected by the reflecting surface 180 until returning into the light guiding plate 80 is small. Accordingly, according to the embodiment, the effects are accomplished in the same manner as the first embodiment such as the efficiency where the light which is emitted from the light emitting elements 89 (light sources) is used as illumination light being high.

In addition, in the embodiment, since the reflecting surface 180 is formed using the smooth surface 180b of the dispersing sheet 182 itself, it is possible to prevent considerable warping of the optical sheets when the optical sheets such as the dispersing sheet 182 and the prism sheets 183 and 184 are arranged to overlap.

Third Embodiment

FIGS. 8A and 8B are explanatory diagrams of a main portion of the liquid crystal display device 100 according to a third embodiment of the invention, and FIGS. 8A and 8B are an explanatory diagram schematically illustrating a cross section of an edge portion of the liquid crystal display device 100 and an explanatory diagram schematically illustrating a cross section of an edge portion of the dispersing sheet 182. Here, since the basic configuration of the embodiment is the same as the first embodiment, common portions have the same reference numeral attached and the description thereof is omitted. In addition, the diagrammatical representation of the lower polarization plate 17 and the upper polarization plate 18 is not included in FIGS. 8A and 8B.

As shown in FIGS. 8A and 8B, even in the liquid crystal display device 100 of the embodiment, the reflecting surface 180 is attached to the portion, which overlaps with the periphery portion 80g of the light guiding plate 80, in the dispersing sheet 182 (light guiding plate side of the optical sheet) which is positioned farthest to the light guiding plate 80 side among the plurality of optical sheets which are formed from the dispersing sheet 182 and the prisms sheets 183 and 184 in the same manner as the first embodiment. The reflecting surface 180 reflects the light which is incident from the side of the light guiding plate 80 toward the light guiding plate 80.

In the embodiment, opposite to the first embodiment, the reflecting surface 180 is attached to the surface 182a (the surface on the side opposite to the light guiding plate 80) on the prism sheet 183 side among the two surfaces 182a and 182b on the dispersing sheet 182.

In the configuring of the reflecting surface 180 in this manner, in the embodiment, the reflecting surface 180 is formed from the reflecting layer 180a which is formed on the dispersing sheet 182 in the same manner as the first embodiment. Here, in the configuring of the reflecting surface 180, a smooth surface is formed in the dispersing sheet 182 itself and the smooth surface may be used as the reflecting surface 180 in the same manner as the second embodiment.

Even with the liquid crystal display device 100 of the embodiment, the light (the arrow L11 in FIG. 8A) which is emitted from the periphery portion 80g of the light guiding plate 80 is returned into the light guiding plate 80 by being reflected by the reflecting surface 180 as shown by the arrow L12 in FIG. 8A, and after this, is emitted as illumination light from the light emitting surface 80b while progressing within the light guiding plate 80 in the same manner as the first embodiment.

In addition, since the reflecting surface 180 is attached to the dispersing sheet 182 which is positioned farthest to the light guiding plate 80 side, the effects are accomplished in the same manner as the first embodiment such as the attenuation of the light which is reflected by the reflecting surface 180 until returning into the light guiding plate 80 being small.

Furthermore, in the forming of the reflecting surface 180 using the reflecting layer 180a, the thickness of the reflecting layer 180a is thinner than the thickness of the dispersing sheet 182. As a result, it is possible to prevent considerable warping of the prism sheets 183 and 184 when the optical sheets of the dispersing sheet 182 and the prism sheets 183 and 184 are arranged to overlap even when the reflecting layer 180a is provided.

Fourth Embodiment

Figure 9A:
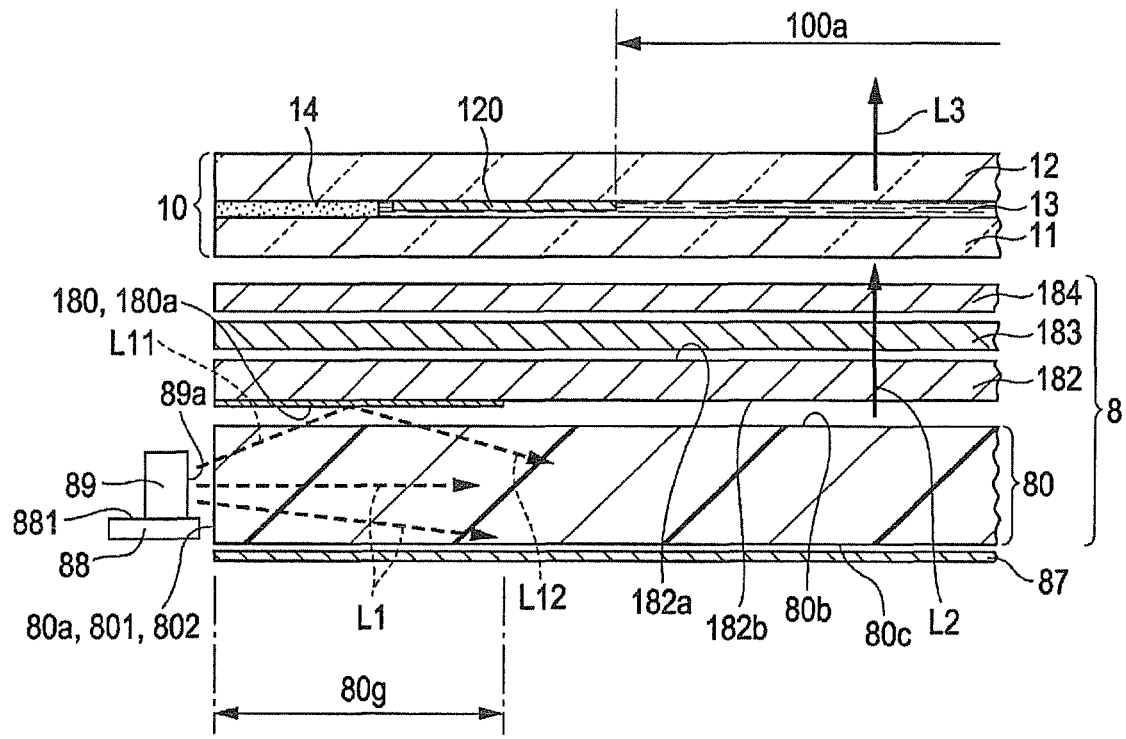
FIGS. 9A and 9B are explanatory diagrams of a main portion of a liquid crystal display device according to a fourth embodiment of the invention.
Figure 9B:
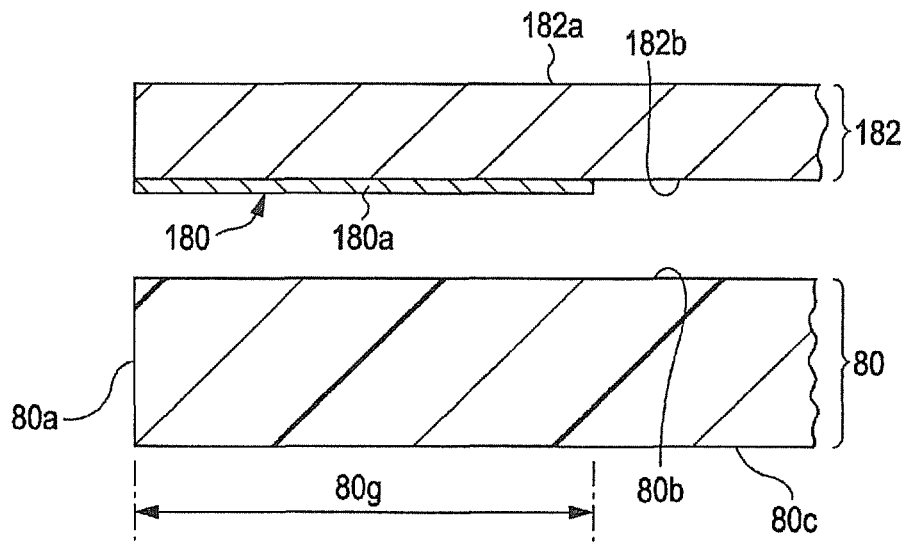

FIGS. 9A and 9B are explanatory diagrams of a main portion of the liquid crystal display device 100 according to a fourth embodiment of the invention, and FIGS. 9A and 9B are an explanatory diagram schematically illustrating a cross section of an edge portion of the liquid crystal display device 100 and an explanatory diagram schematically illustrating a cross section of an edge portion of the dispersing sheet 182. Here, since the basic configuration of the embodiment is the same as the first embodiment, common portions have the same reference numeral attached and the description thereof is omitted. In addition, the diagrammatical representation of the lower polarization plate 17 and the upper polarization plate 18 is not included in FIGS. 9A and 9B.

In the first to third embodiments described above, there is a configuration where the one surface 881 of the light source substrate 88 opposes the light incident surface Other Embodiments In the first to fourth embodiments, both the side of the side edge surface 801 of the light guiding plate 80 and the side of the side edge surface 802 of the light guiding plate 80 are set as the light incident sections 80a, but the invention may be applied to the liquid crystal display device 100 where only either of the side edge surfaces 801 or 802 is the light incident section 80a.

Example of Mounting in Electronic Apparatus

In the embodiments described above, a liquid crystal television is shown as an example as the electronic apparatus 2000 where the liquid crystal display device 100 is mounted, but the liquid crystal display device 100 where the invention is applied may be used in the display section of an electronic apparatus such as a display of a personal computer, digital signage, a car navigation device, a mobile information terminal other than the liquid crystal television.

The entire disclosure of Japanese Patent Application No. 2011-157592, filed Jul. 19, 2011 is expressly incorporated by reference herein.

What is claimed is:

1. A liquid crystal display device comprising:
a light guiding plate that has a plurality of edge surfaces;
a light source that has a light emitting surface, the light source emits a light from the light emitting surface, the light emitted by the light source entering a first edge surface of the plurality of edge surfaces; and
a liquid crystal panel which is arranged to overlap with a second edge surface of the plurality of edge surfaces from which the light emitted by the light source comes out, the liquid crystal panel having a frame edge layer surrounding an image display region;
an optical sheet which is disposed between the liquid crystal panel and the light guiding plate, the optical sheet having a reflecting surface positioned at least at a periphery portion of the optical sheet which is corresponding side to the first edge surface, the reflecting surface having a rectangular frame shape which spans an entire periphery of the optical sheet, the frame edge layer being overlapped with the reflecting surface in plan view, a width of the reflecting surface is less than a distance from an edge of the liquid crystal panel to an edge of the frame edge layer, the edge of the frame edge layer being an edge closest to the image display region, and the reflecting surface has a first side and a second side, and a width of the first side is less than a width of the second side.

2. The liquid crystal display device according to claim 1, the optical sheet is one of a plurality of optical sheets which disposed between the liquid crystal panel and the light guiding plate, and the optical sheet is disposed at a nearest position to a light guiding plate side among the plurality of optical sheets.

3. The liquid crystal display device according to claim 1, wherein the reflecting surface is attached to a surface on a light guiding plate side of the optical sheet.

4. The liquid crystal display device according to claim 1, wherein
a third edge surface of the plurality of edge surfaces is opposite to the first edge surface, and
a second light source that has a second light emitting surface, the second light source emits a second light from the second light emitting surface, the second light emitted by the second light source entering the third edge surface of the plurality of edge surfaces.

5. The liquid crystal display device according to claim 1, wherein the reflecting surface is a reflecting layer which is formed onto the optical sheet.

6. The liquid crystal display device according to claim 5, wherein a thickness of the reflecting layer is thinner than a thickness of the optical sheet.

7. The liquid crystal display device according to claim 5, wherein the reflecting layer is formed from a layer which is white.

8. The liquid crystal display device according to claim 5, wherein the reflecting layer is formed from a layer which has glossiness.

9. The liquid crystal display device according to claim 5, wherein the reflecting layer is formed from a coating film, a transcription film, a sputtering film, a deposition film, and a member with a sheet shape.

10. The liquid crystal display device according to claim 5, wherein the reflecting layer is formed from a smooth surface of the optical sheet.

11. An electronic apparatus comprising:
the liquid crystal display device according to claim 1.

12. A liquid crystal display device comprising:
a light guiding plate that has a plurality of edge surfaces;
a light source that has a light emitting surface, the light source emits a light from the light emitting surface, the light emitted by the light source entering a first edge surface of the plurality of edge surfaces; and
an optical sheet which is arranged such that a first portion of the light emitted by the light source coming out from a second edge surface of the plurality of edge surfaces through light guiding plate enters the optical sheet without transmitting any solid substance; and
a liquid crystal panel which is arranged to overlap with the second edge surface, the liquid crystal panel having a frame edge layer surrounding an image display region; and
a reflecting member that contacts the optical sheet at least a part of at least one sides of a plurality of sides of the optical sheet, the reflecting member having a reflecting surface having a rectangular frame shape which spans an entire periphery of the optical sheet, the frame edge layer being overlapped with the reflecting surface in plan view, a width of the reflecting surface is less than a distance from an edge of the liquid crystal panel to an edge of the frame edge layer, the edge of the frame edge layer being an edge closest to the image display region, and the reflecting surface has a first side and a second side, and a width of the first side is less than a width of the second side.

13. The liquid crystal display device according to claim 12,
the optical sheet is one of a plurality of optical sheets, and the optical sheet is disposed at a nearest position to a light guiding plate side among the plurality of optical sheets.

14. The liquid crystal display device according to claim 12,
wherein the reflecting member is attached to a surface on a light guiding plate side of the optical sheet.

15. The liquid crystal display device according to claim 14,
wherein a thickness of the reflecting member is thinner than a thickness of the optical sheet.

16. The liquid crystal display device according to claim 14,
wherein the reflecting member is formed from a layer which is white.

17. The liquid crystal display device according to claim 14,
wherein the reflecting member is formed from a layer which has glossiness.

18. The liquid crystal display device according to claim 14,
wherein the reflecting member is formed from a coating film, a transcription film, a sputtering film, a deposition film, and a member with a sheet shape.

19. The liquid crystal display device according to claim 14,
wherein the reflecting member is formed from a smooth surface of the optical sheet.

20. The liquid crystal display device according to claim 12, wherein
a third edge surface of the plurality of edge surfaces is opposite to the first edge surface, and
a second light source that has a second light emitting surface, the second light source emits a second light from the second light emitting surface, the second light emitted by the second light source entering the third edge surface of the plurality of edge surfaces.

21. The liquid crystal display device according to claim 12,
wherein the reflecting member is a reflecting layer which is formed onto the optical sheet.

22. An electronic apparatus comprising:
the liquid crystal display device according to claim 12.

23. A liquid crystal display device comprising:
a light guiding plate that has a plurality of edge surfaces;
a light source that has a light emitting surface, the light source emits a light from the light emitting surface, the light emitted by the light source entering a first edge surface of the plurality of edge surfaces; and
an optical sheet which is arranged such that a first portion of the light emitted by the light source coming out from a second edge surface of the plurality of edge surfaces through light guiding plate enters the optical sheet without transmitting any solid substance; and
a liquid crystal panel which is arranged to overlap with the second edge surface, the liquid crystal panel having a frame edge layer surrounding an image display region; and
a reflecting member that contacts the optical sheet, the reflecting member being arranged such that a second portion of the light emitted by the light source coming out from the second edge surface is reflected by the reflecting member and the second portion of the light reflected by the reflecting member enters the light guiding plate, the reflecting member having a reflecting surface having a rectangular frame shape which spans an entire periphery of the optical sheet, the frame edge layer being overlapped with the reflecting surface in plan view, a width of the reflecting surface is less than a distance from an edge of the liquid crystal panel to an edge of the frame edge layer, the edge of the frame edge layer being an edge closest to the image display region, and the reflecting surface has a first side and a second side, and a width of the first side is less than a width of the second side.

24. The liquid crystal display device according to claim 23,
the optical sheet is one of a plurality of optical sheets, and the optical sheet is disposed at a nearest position to a light guiding plate side among the plurality of optical sheets.

25. The liquid crystal display device according to claim 23,
  wherein the reflecting member is attached to a surface on a light guiding plate side of the optical sheet.

26. The liquid crystal display device according to claim 23, wherein
  a third edge surface of the plurality of edge surfaces is opposite to the first edge surface, and
  a second light source that has a second light emitting surface, the second light source emits a second light from the second light emitting surface, the second light emitted by the second light source entering the third edge surface of the plurality of edge surfaces.

27. The liquid crystal display device according to claim 23,
  wherein the reflecting member is a reflecting layer which is formed onto the optical sheet.

28. An electronic apparatus comprising:
  the liquid crystal display device according to claim 23.

29. A liquid crystal display device comprising:
  a light guiding plate that has a plurality of edge surfaces;
  a light source that has a light emitting surface, the light source emits a light from the light emitting surface, the light emitted by the light source entering a first edge surface of the plurality of edge surfaces; and
  a liquid crystal panel which is arranged to overlap with a second edge surface of the plurality of edge surfaces from which the light emitted by the light source comes out, the liquid crystal panel having a frame edge layer surrounding an image display region;
  an optical sheet which is disposed between the liquid crystal panel and the light guiding plate; and
  a reflecting member that is arranged such that a portion of the light emitted by the light source coming out from the second edge surface is reflected by the reflecting member and the portion of the light reflected by the reflecting member enters the light guiding plate, the reflecting member having a reflecting surface having a rectangular frame shape which spans an entire periphery of the optical sheet, the liquid crystal panel having a frame edge layer surrounding an image display region, a width of the reflecting surface is less than a distance from an edge of the liquid crystal panel to an edge of the frame edge layer, the edge of the frame edge layer being an edge closest to the image display region, and the reflecting surface has a first side and a second side, and a width of the first side is less than a width of the second side.

30. The liquid crystal display device according to claim 29,
  the optical sheet is one of a plurality of optical sheets, and the optical sheet is disposed at a nearest position to a light guiding plate side among the plurality of optical sheets.

31. The liquid crystal display device according to claim 29,
  wherein the reflecting member is attached to a surface on a light guiding plate side of the optical sheet.

32. The liquid crystal display device according to claim 29, wherein
  a third edge surface of the plurality of edge surfaces is opposite to the first edge surface, and
  a second light source that has a second light emitting surface, the second light source emits a second light from the second light emitting surface, the second light emitted by the second light source entering the third edge surface of the plurality of edge surfaces.

33. The liquid crystal display device according to claim 29,
  wherein the reflecting member is a reflecting layer which is formed onto the optical sheet.

34. An electronic apparatus comprising:
  the liquid crystal display device according to claim 29.

* * * * *